United States Patent [19]
Gimby

[11] Patent Number: 5,850,266
[45] Date of Patent: Dec. 15, 1998

[54] VIDEO PORT INTERFACE SUPPORTING MULTIPLE DATA FORMATS

[75] Inventor: Robert William Gimby, Plano, Tex.

[73] Assignee: Cirrus Logic, Inc., Fremont, Calif.

[21] Appl. No.: 576,942

[22] Filed: Dec. 22, 1995

[51] Int. Cl.$^6$ .............................. H04N 5/46; H04N 7/00
[52] U.S. Cl. .......................... 348/558; 348/465; 348/716
[58] Field of Search .................... 348/558, 715, 348/716, 717, 555, 556, 563, 564, 569, 465, 467, 468, 473–479; 395/164, 508, 509, 517, 782, 128; 345/115, 116

[56] References Cited

U.S. PATENT DOCUMENTS

| | | | |
|---|---|---|---|
| 4,980,765 | 12/1990 | Kudo et al. | 358/160 |
| 4,985,848 | 1/1991 | Pfeiffer et al. | 395/164 |
| 5,253,062 | 10/1993 | Ohta | 358/160 |
| 5,345,554 | 9/1994 | Lippincott et al. | 395/162 |
| 5,369,442 | 11/1994 | Braun | 348/567 |
| 5,398,083 | 3/1995 | Tsujihara et al. | 348/807 |
| 5,402,147 | 3/1995 | Chen et al. | 345/115 |
| 5,442,747 | 8/1995 | Chan et al. | 395/164 |
| 5,457,776 | 10/1995 | Wong et al. | 395/147 |
| 5,500,680 | 3/1996 | Lee | 348/468 |
| 5,521,613 | 5/1996 | Hayashi | 345/116 |
| 5,521,645 | 5/1996 | Ezaki | 348/465 |
| 5,537,151 | 7/1996 | Orr et al. | 348/564 |
| 5,543,842 | 8/1996 | Xu et al. | 348/387 |
| 5,559,560 | 9/1996 | Lee | 348/465 |
| 5,623,316 | 4/1997 | Naito et al. | 348/569 |
| 5,631,707 | 5/1997 | D'Errico | 348/461 |

*Primary Examiner*—Michael Lee
*Attorney, Agent, or Firm*—David H. Tannenbaum; Steven A. Shaw

[57] ABSTRACT

A video port interface that determines the amount and type of incoming data by reading information from certain memories. A first memory indicates a first format of the incoming data. A second memory indicates a second format of the incoming data. Finally, a third memory indicates a number of lines of the first format that will be received. The video port interface reads all three memories at the beginning of each frame, then counts incoming lines until it reaches the line indicated by the third memory. At the end of that line, the video port interface switches from processing the data in the first format to processing data in the second format.

14 Claims, 1 Drawing Sheet

VIDEO PORT INTERFACE SUPPORTING MULTIPLE DATA FORMATS

TECHNICAL FIELD OF THE INVENTION

This invention pertains in general to signal processing and more particularly to a video port interface for processing a signal containing video and other types of information.

BACKGROUND OF THE INVENTION

A conventional television (TV) signal contains a video signal and a second signal containing non-video information. In the United States, for example, TV signals commonly carry closed caption data along with a NTSC video signal. In other countries, teletext information is carried along with a PAL video signal. Moreover, any future NTSC digital transmitting standards, such as "intercast," will allow greater amounts of data to be carried with NTSC video signals.

The TV signal can basically be described as a rapidly received series of frames, or screens. Each frame, in turn, is composed of a fixed number of lines. Some of the lines contain non-video information, while the other lines contain the video signal.

As multimedia personal computers (PCs) become more powerful, the capability of viewing TV in a window on a computer screen is becoming more commonplace. A multimedia PC typically has a video decoder that receives the TV signal and converts it into a stream of digital data. The digital data is then received by a video port interface of a video chip.

The video port interface receives and processes the digital data. However, the video port interface processes non-video and video data differently. For example, closed caption information may be extracted and sent to a separate decoder means. The video signal, in contrast, may be converted into a different color space, compressed, and then stored in a frame buffer.

Therefore, the video port must be able to distinguish between non-video and video data. Closed captioned data is always sent as the first line of a frame. Therefore, prior art video capture boards can easily distinguish the closed caption data from the video data. However, teletext and other forms of non-video data can be any number of lines long. In fact, an entire frame can contain only non-video data.

Accordingly, a modern video port interface can no longer assume that the non-video data will occupy only the first line of a frame. Therefore, there is a need in the art for a video port interface that can receive and process a variable amount of data in a first format and then receive and process data in a second format. More specifically, there is a need for a video capture interface that can determine when to switch from receiving and processing non-video data to receiving and processing video data.

SUMMARY OF THE INVENTION

The above and other needs are met by a video port interface that determines the amount and type of data by reading information from certain registers. A first register indicates a first format of the incoming data. A second register indicates a second format of the incoming data. Finally, a third register indicates a number of lines of the first format that will be received. The video port interface reads all three registers at the beginning of each frame, then counts incoming lines until it reaches the end of the line indicated by the third register. At that line, the video port interface switches from processing the data in the first format to processing data in the second format.

A technical advantage of the present invention is that the video port interface can receive and process each data format separately. That is, the video port interface can receive the data in a first format using a first process particular to that format then switch to a second process suited to a second format.

Another technical advantage of the present invention is that the video port interface can receive and process frames having variable amounts of data in the first format. Since the video port interface determines when to switch from the first format to the second format, the frames need not have a fixed division between the formats.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
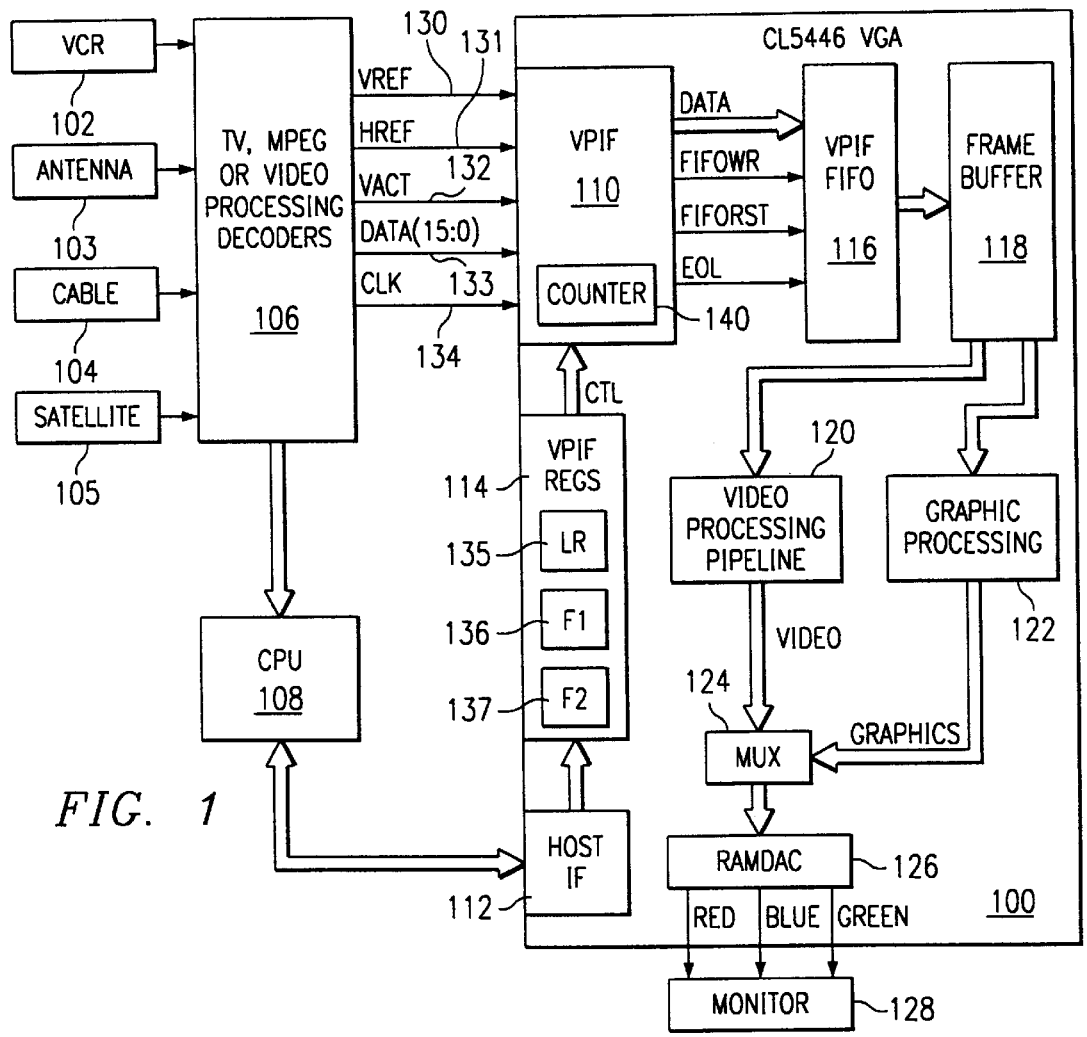
FIG. 1 illustrates a high-level block diagram of a video chip according to the present invention.

FIG. 1 illustrates a high-level block diagram of a video chip 100 according to the present invention. Four outside sources, including a VCR 102, antenna 103, cable 104, and satellite 105 are shown coupled to video processing decoder 106. Decoder 106 is coupled to central processing unit (CPU) 108 and video port interface (VPIF) 110. CPU 108 is coupled to host interface 112. Host interface 112 is coupled to VPIF registers 114. VPIF registers 114, in turn, are coupled to VPIF 110.

VPIF 110 is coupled to VPIF FIFO 116. VPIF FIFO 116 is coupled to frame buffer 118. Frame buffer 118 is coupled to both video processing pipeline 120 and graphics processing logic 122. Both pipeline 120 and logic 122 are coupled to multiplexer 124. Multiplexer 124 is coupled to RAMDAC 126. RAMDAC 126, finally, is coupled to monitor 128.

The decoder 106, CPU 108 and video chip 100 are typically all located within a computer system (PC). The outside sources 102–105, in contrast, are typically remote from the PC and communicate with decoder 106 through an input to the PC.

Although only a VCR 102, antenna 103, cable 104, and satellite 105 are shown as outside sources, the outside source could be any device capable of outputting a television (TV) signal. In addition, the outside source could be a device capable of sending a digital signal in a TV format. For example, the source could be an MPEG file stored on a hard drive within the computer system.

The TV signal output by outside source 102–105 is comprised of frames of data. Each frame, in turn, has a plurality of lines of data. The first 'N' lines of each frame contain data in a first format, while the remaining lines contain data in a second format. 'N' can vary from frame to frame.

The first format is usually a format designed to transmit non-video information to a TV viewer. This information most commonly takes the form of captioning for the video data. However, the first format can also contain information allowing viewing of public information services, stock reports, weather reports, or virtually any other desired textual or graphical data format. Unless otherwise indicated, the first format will be generically referred to as "teletext" data.

The second format is usually a format designed to transmit video information. Thus, the data is typically either in the RGB or YCrCb format. In addition, the second format could be any other type of data, such as audio or teletext. Both the first and second formats may be either 8-bit or 16-bit data. However, the present invention can easily be modified to work with different width data.

Decoder 106 receives the TV signal from the outside source 102–105 and converts it into digital data. Decoder 106 outputs digital signals that are received by VPIF 110. These signals are VREF 130, HREF 131, VACT 132, DATA 133, and CLK 134. These signals are well known in the art but will be briefly described herein. VREF 130 indicates the beginning of a new frame of data. HREF 131 indicates the end of a data line. VACT 132 indicates when active data is being carried by the DATA 133 signal bus. DATA 133, of course, is a bus that carries 8-bit or 16-bit data. CLK 134 is used to synchronize the other signals.

Software executing on CPU 108 reads registers within decoder 106 and determines image constraints for the signal being decoded. Then, the software communicates with video chip 100 via host interface 112 and places values in three registers 135–137 in VPIF registers 114 indicating some of the image constraints.

VPIF registers 114 contain many I/O registers, or memories, that can be set by the software. The present discussion is concerned with three specific registers within VPIF registers 114. Specifically, the software places a value in line register (LR) 135 that contains the value of 'N.' In other words, line register 135 contains a value, 'N,' indicating that the first 'N' lines of the frame will be in a first format.

The software also places a value in format 1 (F1) register 136 indicating the format of the first 'N' lines of the frame. In a preferred embodiment of the present invention, only two bits of the register 136 are used. A first bit enables the videotext capture function. If this bit is not set, then VPIF 110 ignores the value in LR 135 and treats all of the incoming data as data in the second format. If the bit is set, then VPIF 110 looks to the second bit to determine whether the first data format is teletext or closed captioned data. Of course, the exact size and contents of the register can easily be modified and still be within the scope of the present invention.

Finally, the software places a value in format 2 (F2) register 137 indicating the second format of the frame. In a preferred embodiment of the present invention, three bits are used to indicate the format. Among the supported formats are YUV16, RGB16, AccuPak™, and YUV16 to AccuPak encode.

The digital signals 130–133 are received by VPIF 110. VPIF 110 samples the register 135–137 values at the beginning of each frame. Then, VPIF 110 processes the frame's data accordingly. In general, VPIF 110 receives 8-it or 16-it data on data bus 133 and packs the data into a 32-it doubleword. That doubleword is then stored in VPIF FIFO 116. It should be noted that VPIF 110 relies on the values of many registers within VPIF registers 114 to determine exactly how to build the 32-bit doubleword. This discussion, however, focuses on how the values in registers 135–137 affect signal processing.

More specifically, VPIF 110 receives the data on data bus 133 in a specific order. The order of 8-bit data is, for example: Y0, U0, Y1, V0, Y2, U2, Y3, V2, Y4, U4, Y5, V4, Y6, etc., where Y, U, and V are standard video signal components and the number after the component indicates a pixel position. If the data is teletext data, VPIF 110 constructs 32-bit doublewords as Y0Y1Y2Y3, Y4Y5Y6Y7, Y8Y9Y10Y11, etc. If the data is normal YCbCr video data, VPIF 110 constructs 32-bit doublewords as Y0U0Y1V0, Y2U2Y3V2, Y4U4Y5V5, etc.

The 32-bit doublewords constructed by VPIF 110 are transferred to VPIF FIFO 116. VPIF FIFO 116 stores the doublewords until they can be written into frame buffer 118. Frame buffer 118 contains several megabytes of dynamic random access memory (DRAM) that is dedicated for use by the video chip.

Video processing pipeline 120 retrieves video data from frame buffer 118 and processes it for display on monitor 128. Thus, the video processing pipeline performs operations such as color space conversion, chroma interpolation, and scaling. Likewise, graphics processing logic 122 retrieves graphics data from frame buffer 118 and processes it for display on monitor 128. In addition, graphics processing logic 122 generates control signals required by monitor 128.

MUX 124 switches between graphics and video data that is displayed on monitor 128. RAMDAC 126 translates the digital data into red, green, and blue analog components that can be displayed by monitor 128. Monitor 128, of course, displays the video and graphics data. as well as any displayable teletext information.

Figure 2:
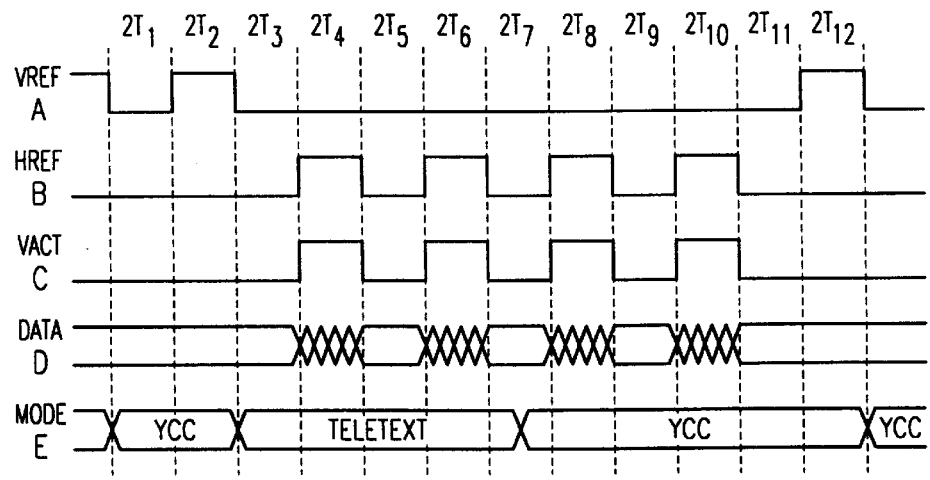
FIG. 2 is a timing diagram illustrating video signals.

FIG. 2 illustrates a timing diagram containing the signals and buses connected to VPIF 110. Shown are VREF A, HREF B, VACT C, DATA D, and MODE E. Signals A–C correspond to signals 130–132, respectively, and are active when high. DATA D bus corresponds to bus 133. MODE E is a bus internal to VPIF 110 and indicates its receiving and processing 110 mode.

At cycle 2T2, VREF A goes high, indicating the beginning of a new frame of data. As VREF A falls, VPIF 110 reads the LR 135, F1 136, and F2 137 registers. As described above, these registers 135–137 tell VPIF 110 the format and amount of incoming data. Thus, VPIF clears an internal counter 140 and begins to count incoming lines of data. For purposes of this discussion, assume the F1 136 register indicates teletext data, the F2 136 register indicates YCrCb video data, and LR 135 indicates 2 lines of teletext data.

At cycle 2T4, HREF B goes high, indicating that a new line of data is being received. Accordingly, VPIF 110 increments its counter 140. Also at cycle 2T4, VACT C transitions high, indicating that active data is being sent on DATA D. As shown by the MODE E bus, VPIF 110 is receiving the data and processing it as teletext data. HREF B goes high again at cycle 2T6. Thus, the second line of teletext data is received and processed and VPIF 110 again increments counter 140.

Since counter 140 has been incremented twice, its value is now equal to the value in LR 135. At cycle 2T7, therefore, VPIF 110 switches from receiving and processing teletext data to receiving and processing video data. This switch is indicated on MODE E. From cycle 2T8 to 2T11, VPIF 110 receives and processes lines of YCrCb video data. Then, at cycle 2T12, VREF A goes high, thereby indicating a new frame of data. Once again, capture port 110 checks the registers 135–137 to determine the amount and format of the incoming data and clears counter 140.

Although the present invention and its advantages have been described in detail, it should be understood that various changes, substitutions and alterations can be made herein without departing from the spirit and scope of the invention as defined by the appended claims.

I claim:

1. A circuit for receiving a data signal comprising a first portion having a first data format and a second portion having a second data format, said circuit comprising:

circuitry for determining the first data format;

circuitry for determining the second data format;

circuitry for determining an amount of data in said first signal portion;

circuitry for counting an amount of data received in said signal and for producing a data count;

circuitry for processing data received in said first signal portion when said data count is less than or equal to said amount of data in said first portion; and circuitry for processing data received in said second signal portion when said data count is more than said amount of data in said first portion.

2. The circuitry of claim 1, wherein the circuitry for determining the first data format comprises:

circuitry for reading a first value in a first register, the first value indicating the first data format.

3. The circuitry of claim 1, wherein the circuitry for determining the second data format comprises:

circuitry for reading a second value in a second register, the second value indicating the second data format.

4. The circuitry of claim 1, wherein the circuitry for determining an amount of said first signal portion comprises:

circuitry for reading a third value in a third register, the third value indicating the amount of data in the first data format.

5. A method of receiving a frame comprised of a plurality of lines of data, wherein a first group of said lines of data has a first data format and a second group of said lines of said data has a second data format, the method comprising the steps of:

determining a first value in a first memory, the first value indicating said first data format;

determining a second value in a second memory, the second value indicating said second data format; and determining a third value in a third memory, the third value indicating a number of said lines in said first group.

6. The method of claim 5, further comprising the steps of:

processing said first group of lines having said first data format; and processing said second group of lines having said second data format.

7. The method of claim 5, wherein the first data format comprises teletext data.

8. The method of claim 5, wherein the second data format comprises video data.

9. The method of claim 5, wherein the first, second, and third memories comprise registers.

10. A video port interface in a computer system for receiving a TV signal from an outside source, the TV signal comprised of a frame comprised of a plurality of lines of data, the video port comprising:

means for determining a first value in a first memory, the first value indicating a first format of the data;

means for determining a second value in a second memory, the second value indicating a second format of the data; and means for determining a third value in a third memory, the third value indicating a number of lines in the first format.

11. A video port interface in a computer system for receiving a TV signal from an outside source, the TV signal comprised of a plurality of frames, each of said frames comprised of a first group of lines having a first data format and a second group of lines having a second data format, the video port comprising:

means for determining a first value in a first memory, the first value indicating said first data format;

means for determining a second value in a second memory, the second value indicating said second data format; and means for determining a third value in a third memory, the third value indicating a number of lines in said first group of lines having said first data format.

12. The video port interface of claim 11, further comprising:

means for processing said first group of lines; and means for processing said second group of lines.

13. The video port interface of claim 11, wherein the first data format comprises teletext data.

14. The video port interface of claim 11, wherein the second data format comprises video data.

* * * * *